(12) United States Patent
Zou et al.

(10) Patent No.: US 10,305,524 B2
(45) Date of Patent: May 28, 2019

(54) METHOD AND DEVICE FOR REDUCING INTERMODULATION INTERFERENCE

(71) Applicant: Huawei Technologies Co., Ltd., Shenzhen, Guangdong (CN)

(72) Inventors: Zhiqiang Zou, Shanghai (CN); Hui Qiao, Shanghai (CN); Honglin Chai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 415 days.

(21) Appl. No.: 15/184,716

(22) Filed: Jun. 16, 2016

(65) Prior Publication Data

US 2016/0301436 A1 Oct. 13, 2016

Related U.S. Application Data

(63) Continuation of application No. PCT/CN2013/089620, filed on Dec. 17, 2013.

(51) Int. Cl.
H04B 1/10 (2006.01)
H04L 5/14 (2006.01)
H04B 1/525 (2015.01)
H04L 27/00 (2006.01)

(52) U.S. Cl.
CPC .......... *H04B 1/1027* (2013.01); *H04B 1/525* (2013.01); *H04L 5/1461* (2013.01); *H04L 27/0008* (2013.01)

(58) Field of Classification Search
CPC ..... H04B 1/525; H04B 1/1027; H04L 5/1461; H04L 27/0008
See application file for complete search history.

(56) References Cited

U.S. PATENT DOCUMENTS

| 2011/0158211 A1 | 6/2011 | Gaal et al. |
| 2011/0256857 A1 | 10/2011 | Chen et al. |
| 2012/0015616 A1 | 1/2012 | Pratt et al. |
| 2012/0140685 A1 | 6/2012 | Lederer et al. |
| 2012/0295558 A1 | 11/2012 | Wang et al. |

(Continued)

FOREIGN PATENT DOCUMENTS

| CN | 101110630 A | 1/2008 |
| CN | 101651485 A | 2/2010 |

(Continued)

*Primary Examiner* — Derrick W Ferris
*Assistant Examiner* — Farhad Ali

(57) ABSTRACT

Embodiments of the present invention provide a method and a device for reducing intermodulation interference. The method includes: performing real-time estimation according to time domain information of M downlink transmit signals, to obtain a first intermodulation interference signal; and cancelling, according to the first intermodulation interference signal, intermodulation interference generated by the M downlink transmit signals in an uplink receive signal, where M is an integer greater than or equal to 2, and the M downlink transmit signals are baseband signals that are transmitted on M carriers and that are not combined. Based on the foregoing solutions, the actually generated intermodulation interference can be effectively cancelled, thereby reducing intermodulation interference and improving system performance.

12 Claims, 5 Drawing Sheets

(56) References Cited

U.S. PATENT DOCUMENTS

2013/0310090 A1     11/2013  Bevan et al.
2015/0349819 A1     12/2015  Meng
2016/0142229 A1*     5/2016  Bevan .................... H04B 1/123
                                                        455/307

FOREIGN PATENT DOCUMENTS

| CN | 102474489 A  | 5/2012  |
| CN | 102611651 A  | 7/2012  |
| CN | 102811069 A  | 12/2012 |
| CN | 103199808 A  | 7/2013  |
| EP | 2874319 A1   | 5/2015  |
| GB | 2502281 A    | 11/2013 |
| JP | 2004320185 A | 11/2004 |

* cited by examiner

METHOD AND DEVICE FOR REDUCING INTERMODULATION INTERFERENCE

CROSS-REFERENCE TO RELATED APPLICATIONS

This application is a continuation of International Application No. PCT/CN2013/089620, filed on Dec. 17, 2013, which is hereby incorporated by reference in its entirety.

TECHNICAL FIELD

Embodiments of the present invention relate to the field of communications technologies, and in particular, to a method and a device for reducing intermodulation interference.

BACKGROUND

In a wireless communications system, in a wireless communications base station system, a baseband processing unit (BBU) performs a baseband algorithm, and may exchange a baseband signal with a remote radio unit (RRU) by using a common public radio interface (CPRI) interface, and then the RRU transmits a downlink transmit signal to an antenna by using a feeder.

However, due to non-ideal factors of some analog components such as a cable, a duplexer, or an antenna feeder, intermodulation such as passive intermodulation (PIM) is generated between multiple downlink transmit signals. In some frequency configurations, an intermodulation frequency may be the same as or close to a frequency of a wanted signal, and lower-order intermodulation generated by a downlink transmit signal overlaps an uplink receive frequency band, that is, a frequency of generated intermodulation interference entirely or partially overlaps an uplink receive frequency. Therefore, interference is caused to the communications system.

SUMMARY

Embodiments of the present invention provide a method and a device for reducing intermodulation interference, which can effectively reduce intermodulation interference.

According to a first aspect, a method for reducing intermodulation interference is provided, where the method includes: performing real-time estimation according to time domain information of M downlink transmit signals, to obtain a first intermodulation interference signal; and cancelling, according to the first intermodulation interference signal, intermodulation interference generated by the M downlink transmit signals in an uplink receive signal, where M is an integer greater than or equal to 2, and the M downlink transmit signals are baseband signals that are transmitted on M carriers and that are not combined.

With reference to the first aspect, in another possible implementation manner, the performing real-time estimation according to time domain information of M downlink transmit signals, to obtain a first intermodulation interference signal includes: acquiring M sampling points that respectively correspond to the M downlink transmit signals at a first moment; determining a component element set according to the M sampling points, where component elements included in the component element set are conjugates of the M sampling points and the M sampling points; determining, according to the component element set, N intermodulation components in a multinomial for estimating the first intermodulation interference signal, where the intermodulation component is a product of at least two component elements and N is a positive integer; determining, according to the N intermodulation components and the uplink receive signal, N coefficients that respectively correspond to the N intermodulation components; and obtaining the first intermodulation interference signal according to a multinomial including the N intermodulation components and the coefficients corresponding to the N intermodulation components.

With reference to the first aspect and any implementation manner of the foregoing implementation manners of the first aspect, in another implementation manner, the performing real-time estimation according to time domain information of M downlink transmit signals, to obtain a first intermodulation interference signal includes: acquiring T delay items, where the delay item indicates a sampling value of a downlink transmit signal after a delay at a first moment and T is a positive integer; determining a component element set according to the T delay items, where component elements included in the component element set are conjugates of the T delay items and the T delay items; determining, according to the component element set, N intermodulation components in a multinomial for estimating the first intermodulation interference signal, where the intermodulation component is a product of at least two component elements; determining, according to the N intermodulation components and the uplink receive signal, N coefficients that respectively correspond to the N intermodulation components; and obtaining the first intermodulation interference signal according to a multinomial including the N intermodulation components and the coefficients corresponding to the N intermodulation components.

With reference to the first aspect and either implementation manner of the foregoing implementation manners of the first aspect, in another implementation manner, the determining, according to the N intermodulation components and the uplink receive signal, N coefficients that respectively correspond to the N intermodulation components includes:

performing elimination on a matrix [A Y] to obtain a matrix [A' Y'], where components in the matrix Y' are the N coefficients, where $$A = \begin{bmatrix} cor(s_1, s_1) & cor(s_1, s_2) & \ldots & cor(s_1, s_{N-1}) & cor(s_1, s_N) \\ cor(s_2, s_1) & cor(s_2, s_2) & \ldots & \ldots & cor(s_2, s_N) \\ \ldots & \ldots & \ldots & & \ldots \\ cor(s_{N-1}, s_1) & \ldots & & \ldots & cor(s_{N-1}, s_N) \\ cor(s_N, s_1) & cor(s_N, s_2) & \ldots & cor(s_N, s_{N-1}) & cor(s_N, s_N) \end{bmatrix},$$

and $$Y = \begin{bmatrix} cor(y, s_1) \\ cor(y, s_2) \\ \ldots \\ cor(y, s_{N-1}) \\ cor(y, s_N) \end{bmatrix},$$

where cor indicates a correlation function, y indicates the uplink receive signal, and $s_i$ indicates an $i^{th}$ intermodulation component of the N intermodulation components, where i is a positive integer and ranges from 1 to N; and the obtaining the first intermodulation interference signal according to a multinomial including the N intermodulation components and the coefficients corresponding to the N intermodulation components includes:

the first intermodulation interference signal being:

$$S^{pim}[N] = \sum_{i=1}^{N} p_i \times s_i,$$

where $p_i$ is an $i^{th}$ intermodulation coefficient of the N coefficients, and $s_i$ is an $i^{th}$ intermodulation component of the N intermodulation components, where i is a positive integer and ranges from 1 to N.

With reference to the first aspect and any implementation manner of the foregoing implementation manners of the first aspect, in another implementation manner, before the obtaining the first intermodulation interference signal according to a multinomial of the N intermodulation components and the N coefficients, the method further includes: performing time alignment on the uplink receive signal and the M downlink transmit signals according to the N intermodulation components and the uplink receive signal.

With reference to the first aspect and any implementation manner of the foregoing implementation manners of the first aspect, in another implementation manner, before the obtaining the first intermodulation interference signal according to a multinomial of the N intermodulation components and the N coefficients, the method further includes: performing time alignment on the uplink receive signal and the M downlink transmit signals according to the N intermodulation components and the uplink receive signal.

With reference to the first aspect and any implementation manner of the foregoing implementation manners of the first aspect, in another implementation manner, the performing time alignment on the uplink receive signal and the M downlink transmit signals according to the N intermodulation components and the uplink receive signal includes:

determining, according to $$cort(s, y, \Delta t) = \sum_{i=1}^{N} s_i \times y^*[i + \Delta t],$$

that when cort(s,y,Δt) is maximum, a value of Δt is a timing error, where $s_i$ is the $i^{th}$ intermodulation component of the N intermodulation components, y*[i+Δt] indicates a conjugate of an $i^{th}$ component of the uplink receive signal y after a delay of Δt, where i is a positive integer and ranges from 1 to N; and performing time alignment on the uplink receive signal and the M downlink transmit signals according to the timing error.

With reference to the first aspect and any implementation manner of the foregoing implementation manners of the first aspect, in another implementation manner, the cancelling, according to the first intermodulation interference signal, intermodulation interference generated by the M downlink transmit signals in an uplink receive signal includes: when the first intermodulation interference signal meets a cancellation condition, cancelling the intermodulation interference in the uplink receive signal by using the first intermodulation interference signal, where the cancellation condition includes at least one of the following: an amplitude of the first intermodulation interference signal is greater than a first threshold, a frequency of the first intermodulation interference signal falls within a frequency band range of the uplink receive signal, and a fluctuation range of the first intermodulation interference signal is less than a second threshold.

With reference to the first aspect and any implementation manner of the foregoing implementation manners of the first aspect, in another implementation manner, before the determining, according to the N intermodulation components and the uplink receive signal, N intermodulation coefficients that respectively correspond to the N intermodulation components, the method further includes: performing frequency modulation on each intermodulation component of the N intermodulation components according to a frequency difference between each intermodulation component of the N intermodulation components and the uplink receive signal.

With reference to the first aspect and any implementation manner of the foregoing implementation manners of the first aspect, in another implementation manner, an execution device of the method is a base station.

According to a second aspect, a device for reducing intermodulation interference is provided, where the device includes: an estimation unit, configured to perform real-time estimation according to time domain information of M downlink transmit signals, to obtain a first intermodulation interference signal; and a cancellation unit, configured to cancel, according to the first intermodulation interference signal obtained through estimation by the estimation unit, intermodulation interference generated by the M downlink transmit signals in an uplink receive signal, where M is an integer greater than or equal to 2, and the M downlink transmit signals are baseband signals that are transmitted on M carriers and that are not combined.

With reference to the second aspect, in another possible implementation manner, the estimation unit is specifically configured to: acquire M sampling points that respectively correspond to the M downlink transmit signals at a first moment; determine a component element set according to the acquired M sampling points, where component elements included in the component element set are conjugates of the M sampling points and the M sampling points; determine, according to the component element set, N intermodulation components in a multinomial for estimating the first intermodulation interference signal, where the intermodulation component is a product of at least two component elements and N is a positive integer; determine, according to the N intermodulation components and the uplink receive signal, N coefficients that respectively correspond to the N intermodulation components; and obtain the first intermodulation interference signal according to a multinomial including the determined N intermodulation components and the determined coefficients corresponding to the N intermodulation components.

With reference to, the second aspect and any implementation manner of the foregoing implementation manners of the second aspect, in another implementation manner, the estimation unit is specifically configured to: acquire T delay items, where the delay item indicates a sampling value of a downlink transmit signal after a delay at a first moment and T is a positive integer; determine a component element set according to the T delay items, where component elements included in the component element set are conjugates of the T delay items and the T delay items; determine, according to the component element set, N intermodulation components in a multinomial for estimating the first intermodulation interference signal, where the intermodulation component is a product of at least two component elements; determine, according to the N intermodulation components and the uplink receive signal, N coefficients that respectively correspond to the N intermodulation components; and obtain the first intermodulation interference signal according to a multinomial including the determined N intermodulation components and the determined coefficients corresponding to the N intermodulation components.

With reference to the second aspect and either implementation manner of the foregoing implementation manners of the second aspect, in another implementation manner, the estimation unit is specifically configured to:

perform elimination on a matrix [A Y] to obtain a matrix [A' Y'], where components in the matrix Y' are the N coefficients, where $$A = \begin{bmatrix} cor(s_1, s_1) & cor(s_1, s_2) & \ldots & cor(s_1, s_{N-1}) & cor(s_1, s_N) \\ cor(s_2, s_1) & cor(s_2, s_2) & \ldots & & cor(s_2, s_N) \\ \ldots & \ldots & \ldots & & \ldots \\ cor(s_{N-1}, s_1) & \ldots & & & cor(s_{N-1}, s_N) \\ cor(s_N, s_1) & cor(s_N, s_2) & \ldots & cor(s_N, s_{N-1}) & cor(s_N, s_N) \end{bmatrix},$$

and $$Y = \begin{bmatrix} cor(y, s_1) \\ cor(y, s_2) \\ \ldots \\ cor(y, s_{N-1}) \\ cor(y, s_N) \end{bmatrix},$$

where cor indicates a correlation function, y indicates the uplink receive signal, and $s_i$ indicates an $i^{th}$ intermodulation component of the N intermodulation components, where i is a positive integer and ranges from 1 to N; and the first intermodulation interference signal obtained through estimation is:

$$S^{pim}[N] = \sum_{i=1}^{N} p_i \times s_i,$$

where $p_i$ is an $i^{th}$ intermodulation coefficient of the N coefficients, and $s_i$ is an $i^{th}$ intermodulation component of the N intermodulation components, where i is a positive integer and ranges from 1 to N.

With reference to the second aspect and any implementation manner of the foregoing implementation manners of the second aspect, in another implementation manner, the device further includes an alignment unit, where the alignment unit is configured to perform time alignment on the uplink receive signal and the M downlink transmit signals according to the N intermodulation components and the uplink receive signal.

With reference to the second aspect and any implementation manner of the foregoing implementation manners of the second aspect, in another implementation manner, the alignment unit is specifically configured to: determine, according to $$cort(s, y, \Delta t) = \sum_{i=1}^{N} s_i \times y^*[i + \Delta t],$$

that when cort(s,y,Δt) is maximum, a value of Δt is a timing error, where $s_i$ is the $i^{th}$ intermodulation component of the N intermodulation components, y*[i+Δt] indicates a conjugate of an $i^{th}$ component of the uplink receive signal y after a delay of Δt, where i is a positive integer and ranges from 1 to N; and perform time alignment on the uplink receive signal and the M downlink transmit signals according to the timing error.

With reference to the second aspect and any implementation manner of the foregoing implementation manners of the second aspect, in another implementation manner, the cancellation unit is specifically configured to:

when the first intermodulation interference signal meets a cancellation condition, cancel the intermodulation interference in the uplink receive signal by using the first intermodulation interference signal, where the cancellation condition includes at least one of the following: an amplitude of the first intermodulation interference signal is greater than a first threshold, a frequency of the first intermodulation interference signal falls within a frequency band range of the uplink receive signal, and a fluctuation range of the first intermodulation interference signal is less than a second threshold.

With reference to any implementation manner of the second aspect and the foregoing implementation manners of the second aspect, in another implementation manner, the device further includes a frequency modulation unit, where the frequency modulation unit is configured to perform frequency modulation on each intermodulation component of the N intermodulation components according to a frequency difference between each intermodulation component of the N intermodulation components and the uplink receive signal.

With reference to the second aspect and any implementation manner of the foregoing implementation manners of the second aspect, in another implementation manner, the device is a base station.

In the embodiments of the present invention, intermodulation interference generated by M downlink transmit signals in an uplink receive signal is cancelled by using first intermodulation interference that is obtained by performing real-time estimation according to time domain information of the M downlink transmit signals. Based on the foregoing solutions, first intermodulation interference obtained by performing real-time estimation on time domain information of M downlink transmit signals approximates intermodulation interference that is actually generated by the M downlink transmit signals in an uplink receive signal, so that the actually generated intermodulation interference can be effectively cancelled, thereby reducing intermodulation interference and improving system performance.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, an LTE system, an LTE frequency division duplex (FDD) system, an LTE time division duplex (TDD) system, and a Universal Mobile Telecommunications System (UMTS). It should be understood that the present invention is not limited thereto.

Figure 1:
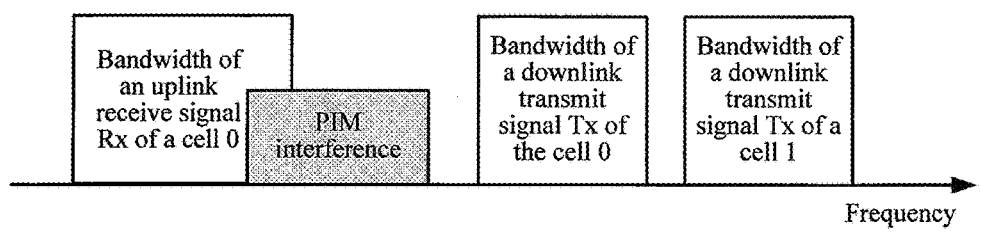
FIG. 1 is a schematic diagram of a frequency spectrum applicable to intermodulation interference according to an embodiment of the present invention.

FIG. 1 is a schematic diagram of a frequency spectrum applicable to intermodulation interference according to an embodiment of the present invention. In the schematic diagram of FIG. 1, PIM interference that is generated between two downlink transmit signals, which are a downlink transmit (Tx) signal of a cell (cell) 0 and a downlink transmit (Tx) signal of a cell 1 respectively is described, and when a frequency of the PIM interference partially or entirely falls within a frequency of an uplink receive signal, for example, a bandwidth of an uplink receive (Rx) signal of the cell 0, that is, intermodulation generated by multiple downlink transmit signals hits an uplink receive frequency band, which causes interference to the uplink receive frequency band.

It should be understood that the schematic diagram of FIG. 1 is merely intended to facilitate understanding but is not intended to limit the scope of the present invention. A quantity of downlink transmit signals that generate intermodulation interference in this embodiment of the present invention may be two or more. It should be further understood that intermodulation interference may be generated between multiple downlink transmit signals of a same cell or intermodulation interference may be generated between downlink transmit signals of different cells, which is not limited in this embodiment of the present invention.

Embodiments of the present invention provide a method and a device for reducing intermodulation interference, which can effectively reduce intermodulation interference.

Figure 2:
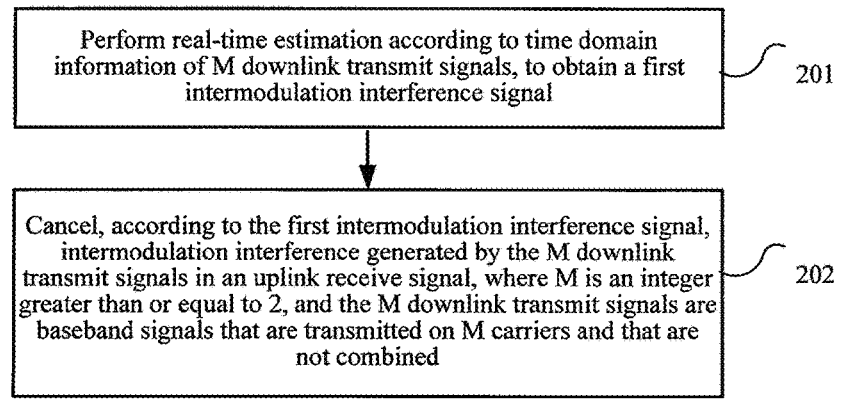
FIG. 2 is a flowchart of a method for reducing intermodulation interference according to an embodiment of the present invention.

FIG. 2 is a flowchart of a method for reducing intermodulation interference according to an embodiment of the present invention.

201: Perform real-time estimation according to time domain information of M downlink transmit signals, to obtain a first intermodulation interference signal.

202: Cancel, according to the first intermodulation interference signal, intermodulation interference generated by the M downlink transmit signals in an uplink receive signal.

M is an integer greater than or equal to 2, and the M downlink transmit signals are baseband signals that are transmitted on M carriers and that are not combined.

In this embodiment of the present invention, intermodulation interference generated by M downlink transmit signals in an uplink receive signal is cancelled by using first intermodulation interference that is obtained by performing real-time estimation according to time domain information of the M downlink transmit signals. Based on the foregoing solution, first intermodulation interference obtained by performing real-time estimation on time domain information of M downlink transmit signals approximates intermodulation interference that is actually generated by the M downlink transmit signals in an uplink receive signal, so that the actually generated intermodulation interference can be effectively cancelled, thereby reducing intermodulation interference and improving system performance.

Figure 3:
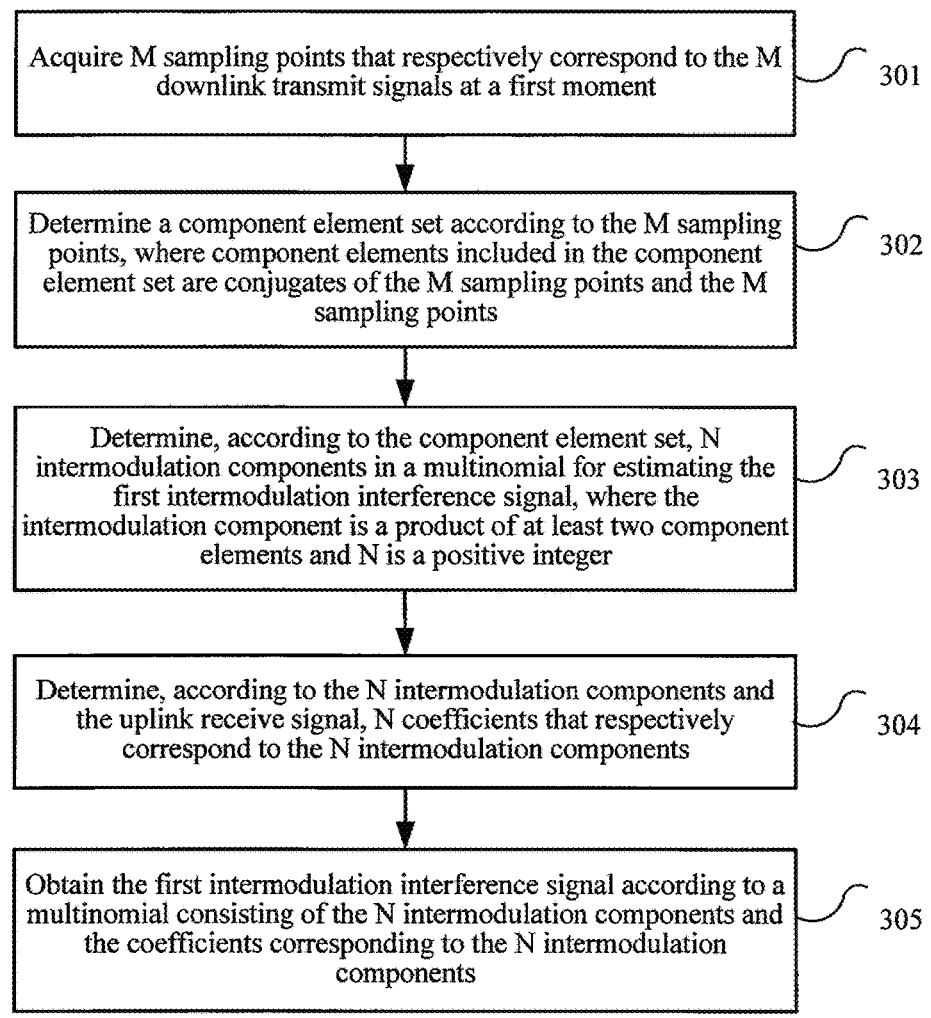
FIG. 3 is a schematic flowchart of a method for estimating intermodulation interference according to an embodiment of the present invention.

Optionally, in an embodiment, in a possible implementation manner, as shown in FIG. 3, step 201 may include:

301: Acquire M sampling points that respectively correspond to the M downlink transmit signals at a first moment.

Optionally, sampling may be separately performed on M downlink transmit signals at the first moment, to acquire the M sampling points, which may be upsampling or may be downsampling.

302: Determine a component element set according to the M sampling points, where component elements included in the component element set are conjugates of the M sampling points and the M sampling points.

303: Determine, according to the component element set, N intermodulation components in a multinomial for estimating the first intermodulation interference signal, where the intermodulation component is a product of at least two component elements and N is a positive integer.

It should be understood that values of M and N may be the same or different, which is not limited in this embodiment of the present invention. It should be further noted that one component element may be selected from the component element set and is determined as an intermodulation component. Preferably, at least two component elements may be selected from the component element set, and a product of the at least two component elements is determined as an intermodulation component.

304: Determine, according to the N intermodulation components and the uplink receive signal, N coefficients that respectively correspond to the N intermodulation components.

305: Obtain the first intermodulation interference signal according to a multinomial including the N intermodulation components and the coefficients corresponding to the N intermodulation components.

Specifically, an example in which two intermodulation components are determined by using two downlink transmit signals is used for description. Assuming that a conjugate is taken separately for two sampling points a[n] and b[n] to obtain two first conjugate values a*[n] and b*[n], and a component element set is {a[n], b[n], a*[n], b*[n]}, two component elements a[n] and b[n] may be selected, and a product a[n]b[n] of a[n] and b[n] is used as a first intermodulation component of the two intermodulation components. Two component elements b[n] and a*[n] are selected, and a product b[n] a*[n] of b[n] and a*[n] is used as a second intermodulation component of the two intermodulation components.

It should be understood that the foregoing example is merely exemplary but is not intended to limit the scope of the present invention, and a quantity of intermodulation components may be one or more.

Figure 4:
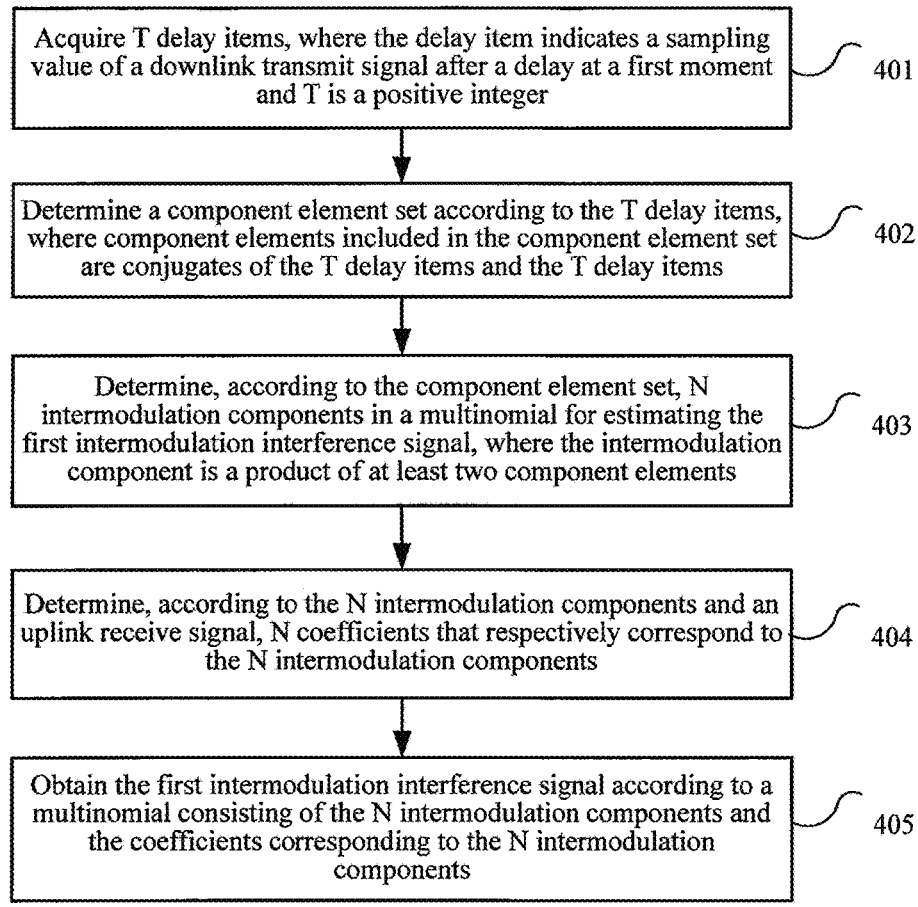
FIG. 4 is a schematic flowchart of a method for estimating intermodulation interference according to another embodiment of the present invention.

In another possible implementation manner, as shown in FIG. 4, step 201 may include:

401: Acquire T delay items, where the delay item indicates a sampling value of a downlink transmit signal after a delay at a first moment and T is a positive integer.

Optionally, some or all sampling points of the M sampling points may be delayed separately to acquire the T delay items; or at a moment after the delay at the first moment, sampling is performed separately on some or all downlink transmit signals of the M downlink transmit signals to acquire the T delay items.

402: Determine a component element set according to the T delay items, where component elements included in the component element set are conjugates of the T delay items and the T delay items.

403: Determine, according to the component element set, N intermodulation components in a multinomial for estimating the first intermodulation interference signal, where the intermodulation component is a product of at least two component elements.

404: Determine, according to the N intermodulation components and the uplink receive signal, N coefficients that respectively correspond to the N intermodulation components.

405: Obtain the first intermodulation interference signal according to a multinomial including the N intermodulation components and the coefficients corresponding to the N intermodulation components.

Specifically, two downlink transmit signals: a first downlink transmit signal and a second downlink transmit signal are used as an example. At an $n^{th}$ moment, sampling is performed on the first downlink transmit signal to obtain a sampling point a[n], and sampling is performed on the second downlink transmit signal to obtain a sampling point b[n]. For example, if a delayed moment is an $(n+1)^{th}$ moment, the sampling points a[n] and b[n] are delayed respectively to obtain delay items a[n+1] and b[n+1], and a determined component element set is {a[n+1],b[n+1], a*[n+1], b*[n+1]}. For another example, if a delayed moment is an $(n-1)^{th}$ moment, the sampling points a[n] and b[n] are delayed respectively to obtain delay items a[n-1] and b[n-1], and a determined component element set is {a[n-1], b[n-1], a*[n-1], b*[n-1]}, where n is a positive integer.

Certainly, delays of sampling points of different downlink transmit signals may be different, for example, sampling points a[n] and b[n] are delayed respectively to obtain delay items a[n+1] and b[n-1]. Optionally, delay items may be acquired by using sampling points of the M downlink transmit signals at a moment after a delay at the $n^{th}$ moment. For example, at the $(n-1)^{th}$ moment, sampling is performed on the first downlink transmit signal to obtain the sampling point a[n-1], that is, a delay item obtained after the sampling point a[n] is delayed by −1.

It should be understood that a manner of acquiring a delay item is not limited in this embodiment of the present invention. It should be further noted that the foregoing examples are merely exemplary, for example, the delay may also be ±2, ±3, . . . ; and a quantity of the downlink transmit signals may be two or more.

By means of the foregoing solution, based on M sampling points that respectively correspond to the M downlink transmit signals at a same moment, in a scenario of a wireless multipath channel, for example, different downlink transmit signals have different physical channels, and may arrive at different time, or transmission speeds of downlink transmit signals of different frequencies in a same channel are different; as a result, signals are scattered within different time. Therefore, an original source signal may be better recovered by weighting signals at different time intervals. Therefore, in consideration to the T delay items, that is, the sampling values of the downlink transmit signals after the delay at the first moment, accuracy of obtaining through estimation the first intermodulation interference signal is further improved, and the first intermodulation interference signal is used to cancel an intermodulation interference signal generated by the M downlink transmit signals in the uplink receive signal, so that the intermodulation interference is further reduced.

It should be further noted that the embodiments of FIG. 3 and FIG. 4 may be combined, for example, a component element set is determined according to the M sampling points and the T delay items, where the component element set includes the M sampling points, the T delay items, conjugates of the M sampling points, and conjugates of the T delay items. Specifically, an $i^{th}$ intermodulation component of the N intermodulation components may be determined according to $L_i$ component elements selected from the component element set, where $L_i$ is an integer greater than or equal to 2 and indicates a quantity of elements used to determine the $i^{th}$ intermodulation component, and i is a positive integer and ranges from 1 to N. Optionally, a product of the $L_i$ component elements is determined as the $i^{th}$ intermodulation component of the N intermodulation components.

For ease of understanding, using two downlink transmit signals and two intermodulation components as an example, and assuming that a conjugate is taken separately for two sampling points a[n] and b[n] to obtain conjugate values a*[n] and b*[n], and two delay items are acquired, which respectively are a[n+1] and b[n+1], a conjugate is taken separately to obtain conjugate values a*[n+1] and b*[n+1]. A component element set is {a[n], b[n], a*[n], b*[n], a[n+1], b[n+1], a*[n+1], b*[n+1]}, and $L_1$ component elements are selected from the component element set, for example, a product a[n]b*[n+1] of two elements a[n] and b*[n+1] is determined as a first intermodulation component $s_1$ of the two intermodulation components. $L_2$ component elements are selected from the component element set, for example, a product a*[n]a[n]b*[n+1] of three elements a*[n], a[n], and b*[n+1] is determined as a second intermodulation component $s_2$ of the two intermodulation component, that is, the two intermodulation components are a[n]b*[n+1] and a*[n]a[n]b*[n+1] respectively.

For example, assuming that a conjugate is taken separately for two sampling points a[n] and b[n] to obtain conjugate values a*[n] and b*[n], and three delay items are acquired, which respectively are a[n−1], a[n+1], and b[n+1], a conjugate is taken separately to obtain conjugate values a*[n−1], a*[n+1], and b*[n+1]. A component element set is {a[n], b[n], a*[n], b*[n], a[n+1], b[n+1], a*[n+1], a*[n−1], a[n−1], b*[n+1]}, and assuming that three intermodulation components are determined, $L_2$ component elements are selected from the component element set, for example, a product a*[n]a[n]b*[n+1] of three elements a*[n], a[n], and b*[n+1] is determined as a first intermodulation component $s_2$ of the three intermodulation components; $L_3$ component elements are selected from the component element set, for example, a product a*[n−1]a[n] of two elements a*[n−1] and a[n] is determined as a second intermodulation component $s_3$ of the three intermodulation components; and $L_4$ component elements are selected from the component element set, for example, a product a[n]b*[n+1] of two elements a[n] and b*[n+1] is determined as a third intermodulation component $s_4$ of the three intermodulation components, that is, the three intermodulation components are a[n], a*[n]a[n]b*[n+1], a*[n−1]a[n], and a[n]b*[n+1] respectively.

It should be understood that a quantity of elements for determining an intermodulation component, a quantity of intermodulation components and a quantity of delay items are not limited in this embodiment of the present invention, and an intermodulation component may be a component element in a component element set or a product of multiple component elements, and a quantity of elements used by different intermodulation components may be the same or different, and different intermodulation components may also be the same or different.

It should be further noted that in this embodiment of the present invention, a sampling point may be acquired in real time and cancellation may be performed in real time.

Optionally, in another embodiment, in step 304 or step 404, elimination may be performed on a matrix [A Y] of N rows and N+1 columns to obtain a matrix [A' Y'], and row components in a matrix Y' of N rows and one column are determined as the N coefficients, where A is a matrix of N rows and N columns, and Y is a matrix of N rows and one column, which is expressed as follows:

$$A = \begin{bmatrix} cor(s_1, s_1) & cor(s_1, s_2) & \ldots & cor(s_1, s_{N-1}) & cor(s_1, s_N) \\ cor(s_2, s_1) & cor(s_2, s_2) & \ldots & & cor(s_2, s_N) \\ \ldots & \ldots & \ldots & & \ldots \\ cor(s_{N-1}, s_1) & \ldots & & & cor(s_{N-1}, s_N) \\ cor(s_N, s_1) & cor(s_N, s_2) & \ldots & cor(s_N, s_{N-1}) & cor(s_N, s_N) \end{bmatrix},$$

and $$Y = \begin{bmatrix} cor(y, s_1) \\ cor(y, s_2) \\ \ldots \\ cor(y, s_{N-1}) \\ cor(y, s_N) \end{bmatrix},$$

where cor indicates a correlation function, for example, cor(x1, x2) indicates an inner product of vectors x1 and x2 of a same length, cor(x1, x2)=cor(x2, x1), $s_i$ indicates an $i^{th}$ intermodulation component of the N intermodulation components, where i is a positive integer and ranges from 1 to N, that is, the N intermodulation components are $s_1, s_2, \ldots,$ and $s_N$ respectively, and y indicates the foregoing uplink receive signal.

It is assumed that $$Y' = \begin{bmatrix} p_1 \\ p_2 \\ \ldots \\ p_{N-1} \\ p_N \end{bmatrix}$$

in the matrix [A' Y'] is obtained by performing elimination, that is, the N intermodulation coefficients are $p_1, p_2, \ldots,$ and $p_N$ respectively. An elimination method in this embodiment of the present invention may use a Gauss elimination method or another equivalent elimination method, and it should be understood that this embodiment of the present invention is not limited thereto.

Correspondingly, in step 305 or step 405, a product of an $i^{th}$ intermodulation component $s_i$ of the N intermodulation components and an $i^{th}$ intermodulation coefficient $p_i$ of the corresponding N intermodulation coefficients is determined as an $i^{th}$ component $s_i^{pim}=p_i \times s_i$ of the first intermodulation interference signal obtained through estimation, and the estimated first intermodulation interference signal is $$S^{pim}[N] = \sum_{i=1}^{N} p_i \times s_i.$$

Optionally, in another embodiment, time alignment, also referred to as timing synchronization, may be performed on the uplink receive signal and the downlink transmit signal. Optionally, time alignment is performed on the uplink receive signal and the M downlink transmit signals according to the N intermodulation components and the uplink receive signal.

Specifically, it may be determined, according to an equation $$cort(s, y, \Delta t) = \sum_{i=1}^{N} s_i \times y^*[i + \Delta t] = \sum_{i=1}^{N} s[i + \Delta t] \times y_i^*,$$

that when a correlated peak cort(s,y,$\Delta$t) is maximum, a value of $\Delta$t is a timing error, where cort(s,y,$\Delta$t) indicates an inner product of a vector s and a vector y that has a time offset of $\Delta$t, which are of a same length, or cort(s,y,$\Delta$t) indicates an inner product of a vector s that has a time offset of $\Delta$t and a vector y, which are of a same length. Optionally, by means of correlated searching, values of $\Delta$t are traversed within a specific range, so that when the correlated peak cort(s,y,$\Delta$t) is maximum, $\Delta$t is determined as the timing error, where $s_i$ is an $i^{th}$ intermodulation component of the N intermodulation components, y*[i+$\Delta$t] indicates a conjugate of an $i^{th}$ component of the uplink receive signal y after a delay of $\Delta$t, where i is a positive integer and ranges from 1 to N. Time alignment is performed on the uplink receive signal and the M downlink transmit signals according to the timing error.

Optionally, in another embodiment, in a case in which the first intermodulation interference signal meets a cancellation condition, an intermodulation interference signal in the uplink receive signal is canceled by using the first intermodulation interference signal. The cancellation condition may include at least one of the following: an amplitude of the first intermodulation interference signal is greater than a first threshold, a frequency of the first intermodulation interference signal falls within a frequency band range of the uplink receive signal, that is, a frequency spectrum of the first intermodulation interference signal partially or entirely falls within a bandwidth of the uplink receive signal, and a fluctuation range of the first intermodulation interference signal is less than a second threshold, that is, the first intermodulation interference signal is stable. In a case in which the first intermodulation interference signal meets the cancellation condition, that is, in a case in which it is estimated that intermodulation generated between multiple downlink transmit signals causes serious interference to the uplink receive signal, the intermodulation interference signal in the uplink receive signal is cancelled by using the first intermodulation interference signal, to reduce interference.

Specifically, when the frequency of the first intermodulation interference signal hits a frequency of odd-order intermodulation of the uplink receive signal, that is, the frequency of the first intermodulation interference signal partially or entirely overlaps the frequency of odd-order intermodulation of the uplink receive signal, the intermodulation interference in the uplink receive signal is cancelled by using the first intermodulation interference signal. Using two downlink transmit signals as an example for description, it is assumed that a frequency domain bandwidth of a first downlink transmit signal a of the two downlink transmit signals, for example, transmit signals is $B_a$, and a center frequency is denoted as $f_a$, and a frequency domain bandwidth of a second downlink transmit signal b is denoted as $B_b$, and a center frequency is denoted as $f_b$. Hit frequencies of m1+n1-order intermodulation is $m1f_a - n1f_b$ and $m1f_b - n1f_a$, and bandwidths are $m1B_a + n1B_b$ and $m1B_b + n1B_a$, where m1 and n1 are positive integers. Preferably, values of m1 and n1 are as close as possible, that is, an absolute value of a difference between m1 and n1 is less than a specific value. For example, hit (center) frequencies of third-order intermodulation are $2f_a - f_b$ and $2f_b - f_a$, and bandwidths are $2B_a + B_b$ and $2B_b + B_a$; and hit frequencies of fifth-order intermodulation are $3f_a - 2f_b$ and $3f_b - 2f_a$, and bandwidths are $3B_a - 2B_b$ and $3B_b - 2B_a$; and so on. Optionally, a higher order indicates lower intermodulation power, so that higher order intermodulation may be ignored, that is, only a case in which a value of m1+n1 is less than a specific order may be considered.

Optionally, in another embodiment, before step 203, frequency modulation may be separately performed on the N intermodulation components, and optionally, frequency modulation may be performed on each intermodulation component of the N intermodulation components according to a frequency difference between each intermodulation component of the N intermodulation components and the uplink receive signal. For example, an intermodulation component $s_i$ is $a^*[n]a[n]b[n]$, and after frequency modulation, the intermodulation component is $s_i = a[n]a^*[n]b[n] \times e^{j\Delta\omega t}$, where $\Delta\omega$ indicates an angular frequency difference between the intermodulation component and the uplink receive signal, that is, $2\pi^{\Delta f}$, where f indicates a frequency, and t indicates a time.

Figure 5:
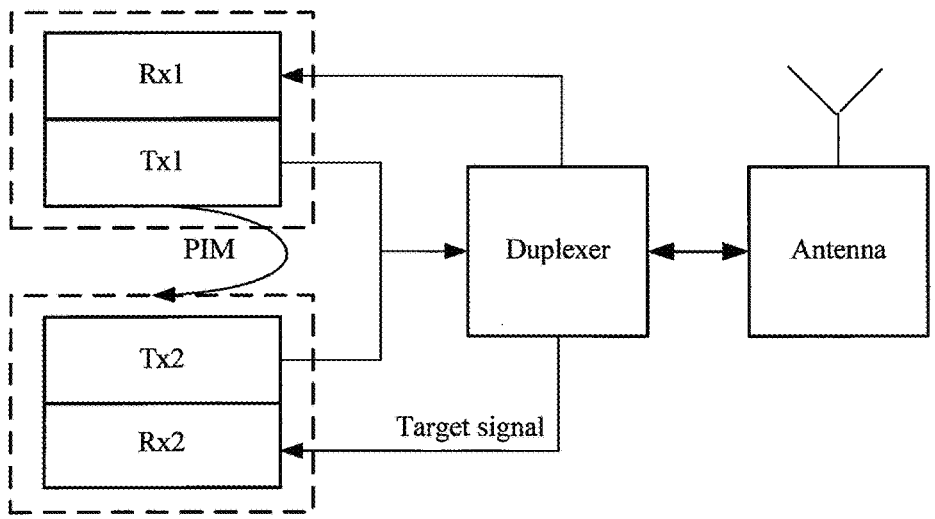
FIG. 5 is a schematic diagram of a scenario in which intermodulation interference is generated and that is applicable to an embodiment of the present invention.

Optionally, in another embodiment, multiple downlink transmit signals may be from a same transmit channel or different transmit channels, and using two downlink transmit signals as an example, as exemplarily shown in FIG. 5, PIM interference between a downlink transmit signal Tx1 from a channel 1 and a downlink transmit signal Tx2 from a channel 2 is generated in an uplink receive signal Rx2 from the channel 2. By canceling the PIM interference in the receive signal by using the first intermodulation interference signal obtained through estimation, a signal-to-noise ratio can be improved and sensitivity of a receiver can be improved.

Optionally, signal processing may be performed on the downlink transmit signal, and signal processing may also be performed on the uplink receive signal; and a signal processing manner includes, but is not limited to, amplitude modulation, phase modulation, or filtering. For example, scaleable sample filtering may be performed on the downlink transmit signal, so that when a sampling bandwidth, also referred to as an observation bandwidth, is insufficient, upsampling filtering may be added to increase the observation bandwidth to avoid aliasing.

Optionally, a digital filter, such as a filter that simulates intermediate radio frequency (IRF) processing may be used during the signal processing. IRF intermodulation interference is cancelled by using a digital processing method in a baseband, zero frequency, and a signal passing through an intermediate radio frequency is equivalent to a signal passing through a filter, so that accuracy of cancellation can be improved by performing simulation by using the digital filter in the baseband.

Figure 6:
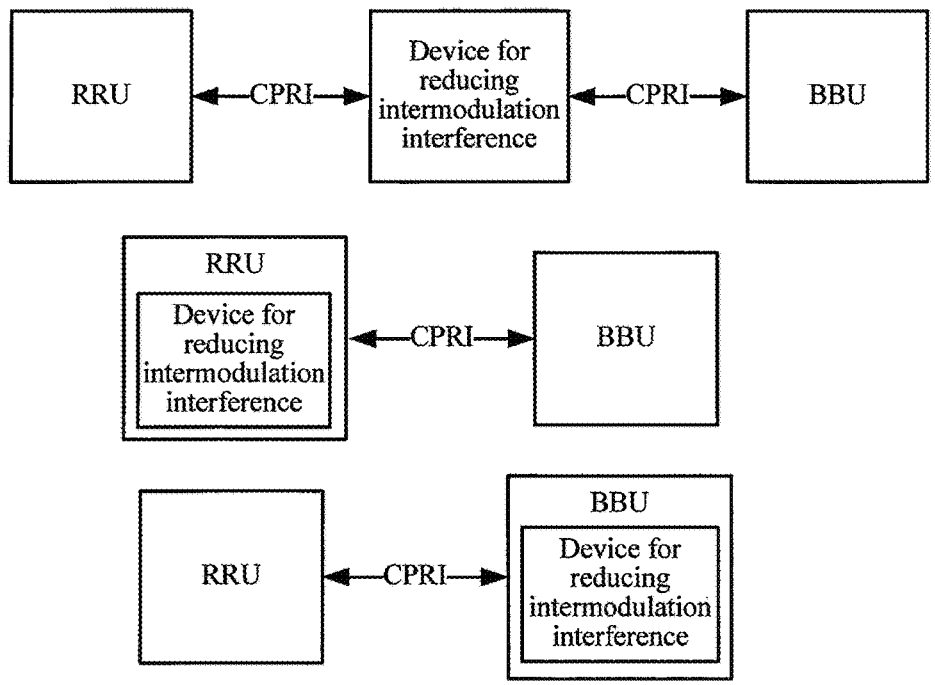
FIG. 6 is a schematic diagram of a location of a device for reducing intermodulation interference according to an embodiment of the present invention.

Optionally, in another embodiment, in this embodiment of the present invention, the first intermodulation interference signal may be obtained through estimation in a digital domain manner without a need of designing an analog circuit or adding a digital-to-analog conversion component and printed circuit board (PCB) space, thereby simplifying a design and reducing costs. An execution device of the foregoing method may be a base station. Specifically, the execution device may be located in an RRU, that is, the foregoing method is performed by the RRU or may be performed by a BBU; and the execution device may also be located between the RRU and the BBU as an independent apparatus. Optionally, apparatuses may be connected by using a CPRI interface, for example, when the execution device of the foregoing method is located in the RRU, the RRU acquires a sampling point or a delay item from the BBU by using the CPRI interface. As exemplarily shown in FIG. 6, it should be understood that this embodiment of the present invention is not limited thereto.

Figure 7:
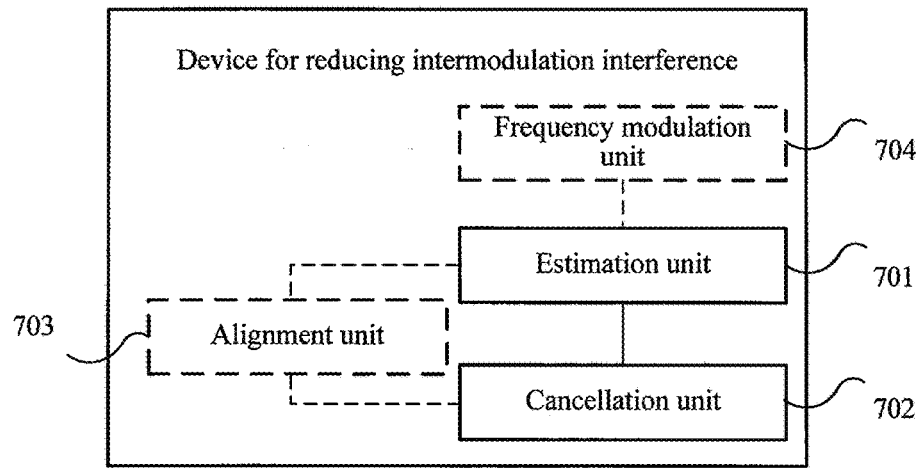
FIG. 7 is a structural block diagram of a device for reducing intermodulation interference according to an embodiment of the present invention.

FIG. 7 is a structural block diagram of a device for reducing intermodulation interference according to an embodiment of the present invention. The device 700 for reducing intermodulation interference in FIG. 7 includes an estimation unit 701 and a cancellation unit 702.

The estimation unit 701 is configured to perform real-time estimation according to time domain information of M downlink transmit signals, to obtain a first intermodulation interference signal.

The cancellation unit 702 is configured to cancel intermodulation interference generated by the M downlink transmit signals in an uplink receive signal according to the first intermodulation interference signal obtained through estimation by the estimation unit 701.

M is an integer greater than or equal to 2, and the M downlink transmit signals are baseband signals that are transmitted on M carriers and that are not combined.

In this embodiment of the present invention, intermodulation interference generated by M downlink transmit signals in an uplink receive signal is cancelled by using first intermodulation interference that is obtained by performing real-time estimation according to time domain information of the M downlink transmit signals. Based on the foregoing solution, first intermodulation interference obtained by performing real-time estimation on time domain information of M downlink transmit signals approximates intermodulation interference that is actually generated by the M downlink transmit signals in an uplink receive signal, so that the actually generated intermodulation interference can be effectively cancelled, thereby reducing intermodulation interference and improving system performance.

The device 700 for reducing intermodulation interference can implement the embodiments in FIG. 2 to FIG. 4, so that in order to avoid repetition, details are not described herein again.

Optionally, in an embodiment, in a possible implementation manner, the estimation unit 701 may be specifically configured to: acquire M sampling points that respectively correspond to the M downlink transmit signals at a first moment; determine a component element set according to the acquired M sampling points, where component elements included in the component element set are conjugates of the M sampling points and the M sampling points; determine, according to the component element set, N intermodulation components in a multinomial for estimating the first intermodulation interference signal, where the intermodulation component is a product of at least two component elements and N is a positive integer; determine, according to the N intermodulation components and the uplink receive signal, N coefficients that respectively correspond to the N intermodulation components; and obtain the first intermodulation interference signal according to a multinomial including the determined N intermodulation components and the determined coefficients corresponding to the N intermodulation components.

It should be understood that values of M and N may be the same or different, which is not limited in this embodiment of the present invention. It should be further noted that one component element may be selected from the component element set and is determined as an intermodulation component. Preferably, at least two component elements may be selected from the component element set, and a product of the at least two component elements is determined as an intermodulation component.

In another possible implementation manner, the estimation unit 701 may be specifically configured to: acquire T delay items, where the delay item indicates a sampling value of a downlink transmit signal after a delay at a first moment and T is a positive integer; determine a component element set according to the T delay items, where component elements included in the component element set are conjugates of the T delay items and the T delay items; determine, according to the component element set, N intermodulation components in a multinomial for estimating the first intermodulation interference signal, where the intermodulation component is a product of at least two component elements; determine, according to the N intermodulation components and the uplink receive signal, N coefficients that respectively correspond to the N intermodulation components; and obtain the first intermodulation interference signal according to a multinomial including the determined N intermodulation components and the determined coefficients corresponding to the N intermodulation components.

It should be understood that a manner of acquiring a delay item is not limited in this embodiment of the present invention. It should be further noted that the foregoing examples are merely exemplary, for example, the delay may also be ±2, ±3, . . . ; and a quantity of the downlink transmit signals may be two or more.

By means of the foregoing solution, based on M sampling points that respectively correspond to the M downlink transmit signals at a same moment, in a scenario of a wireless multipath channel, for example, different downlink transmit signals have different physical channels, and may arrive at different time, or transmission speeds of downlink transmit signals of different frequencies in a same channel are different; as a result, signals are scattered within different time. Therefore, an original source signal may be better recovered by weighting signals at different time intervals. Therefore, in consideration to the T delay items, that is, the sampling values of the downlink transmit signals after the delay at the first moment, accuracy of obtaining through estimation the first intermodulation interference signal is further improved, and the first intermodulation interference signal is used to cancel an intermodulation interference signal generated by the M downlink transmit signals in the uplink receive signal, so that the intermodulation interference is further reduced.

It should be further noted that the component element set may also be determined according to the M sampling points and the T delay items. For specific examples, reference may be made to the foregoing descriptions, and details are not described herein again.

Further, the estimation unit may be specifically configured to: perform elimination on a matrix [A Y] of N rows and N+1 columns to obtain a matrix [A' Y'], and determine row components in a matrix Y' of N rows and one column as the N coefficients, where A is a matrix of N rows and N columns, and Y is a matrix of N rows and one column, which is expressed as follows:

$$A = \begin{bmatrix} cor(s_1, s_1) & cor(s_1, s_2) & \ldots & cor(s_1, s_{N-1}) & cor(s_1, s_N) \\ cor(s_2, s_1) & cor(s_2, s_2) & \ldots & & cor(s_2, s_N) \\ \ldots & \ldots & \ldots & & \ldots \\ cor(s_{N-1}, s_1) & \ldots & & \ldots & cor(s_{N-1}, s_N) \\ cor(s_N, s_1) & cor(s_N, s_2) & \ldots & cor(s_N, s_{N-1}) & cor(s_N, s_N) \end{bmatrix},$$

and $$Y = \begin{bmatrix} cor(y, s_1) \\ cor(y, s_2) \\ \ldots \\ cor(y, s_{N-1}) \\ cor(y, s_N) \end{bmatrix},$$

where cor indicates a correlation function, for example, cor(x1, x2) indicates an inner product of vectors x1 and x2 of a same length, cor(x1, x2)=cor(x2, x1), $s_i$ indicates an $i^{th}$ intermodulation component of the N intermodulation components, where i is a positive integer and ranges from 1 to N, that is, the N intermodulation components are $s_1, s_2, \ldots,$ and $s_N$ respectively, and y indicates the foregoing uplink receive signal.

It is assumed that $$Y' = \begin{bmatrix} p_1 \\ p_2 \\ \ldots \\ p_{N-1} \\ p_N \end{bmatrix}$$

in the matrix [A' Y'] is obtained by performing elimination, that is, the N intermodulation coefficients are $p_1, p_2, \ldots,$ and $p_N$ respectively. An elimination method in this embodiment of the present invention may use a Gauss elimination method or another equivalent elimination method, and it should be understood that this embodiment of the present invention is not limited thereto.

Correspondingly, a product of an $i^{th}$ intermodulation component $s_i$ of the N intermodulation components and an $i^{th}$ intermodulation coefficient $p_i$ of the corresponding N intermodulation coefficients is determined as an $i^{th}$ component $s_i^{pim} = p_i \times s_i$ of the first intermodulation interference signal obtained through estimation, and the estimated first intermodulation interference signal is $$S^{pim}[N] = \sum_{i=1}^{N} p_i \times s_i.$$

Optionally, in another embodiment, the device 700 for reducing intermodulation interference may further includes an alignment unit 703, where the alignment unit 703 is configured to perform time alignment on the uplink receive signal and the M downlink transmit signals according to the N intermodulation components and the uplink receive signal.

Further, the alignment unit 703 may be specifically configured to: determine, according to an equation $$cort(s, y, \Delta t) = \sum_{i=1}^{N} s_i \times y^*[i + \Delta t] = \sum_{i=1}^{N} s[i + \Delta t] \times y_i^*,$$

that when a correlated peak cort(s,y,Δt) is maximum, a value of Δt is a timing error, where cort(s,y,Δt) indicates an inner product of a vector s and a vector y that has a time offset of Δt, which are of a same length, or cort(s,y,Δt) indicates an inner product of a vector s that has a time offset of Δt and a vector y, which are of a same length. Optionally, by means of correlated searching, values of Δt are traversed within a specific range, so that when the correlated peak cort(s,y,Δt) is maximum, Δt is determined as the timing error, where $s_i$ is an $i^{th}$ intermodulation component of the N intermodulation components, y*[i+Δt] indicates a conjugate of an $i^{th}$ component of the uplink receive signal y after a delay of N, where i is a positive integer and ranges from 1 to N. Time alignment is performed on the uplink receive signal and the M downlink transmit signals according to the timing error.

Optionally, in another embodiment, the cancellation unit 702 is specifically configured to: when the first intermodulation interference signal meets a cancellation condition, cancel the intermodulation interference signal in the uplink receive signal by using the first intermodulation interference signal. The cancellation condition may include at least one of the following: an amplitude of the first intermodulation interference signal is greater than a first threshold, a frequency of the first intermodulation interference signal falls within a frequency band range of the uplink receive signal, that is, a frequency spectrum of the first intermodulation interference signal partially or entirely falls within a bandwidth of the uplink receive signal, and a fluctuation range of the first intermodulation interference signal is less than a second threshold, that is, the first intermodulation interference signal is stable. In a case in which the first intermodulation interference signal meets the cancellation condition, that is, in a case in which it is estimated that intermodulation generated between multiple downlink transmit signals causes serious interference to the uplink receive signal, the intermodulation interference signal in the uplink receive signal is cancelled by using the first intermodulation interference signal, to reduce interference. For specific examples, reference may be made to the foregoing descriptions, and details are not described herein again.

Optionally, in another embodiment, multiple downlink transmit signals in this embodiment of the present invention may be from a same transmit channel or different transmit channels. Using two downlink transmit signals as an example, as exemplarily shown in FIG. 5, PIM interference between a downlink transmit signal Tx1 from a channel 1 and a downlink transmit signal Tx2 from a channel 2 is generated in an uplink receive signal Rx2 from the channel 2. By canceling the PIM interference in the receive signal by using the first intermodulation interference signal obtained through estimation, a signal-to-noise ratio can be improved and sensitivity of a receiver can be improved.

Optionally, in another embodiment, the device 700 for reducing intermodulation interference may further includes a frequency modulation unit 704, where the frequency modulation unit 704 is configured to separately perform frequency modulation on the N intermodulation components; and optionally, the frequency modulation unit 704 may perform frequency modulation on each intermodulation component of the N intermodulation components according to a frequency difference between each intermodulation component of the N intermodulation components and the uplink receive signal.

Optionally, in another embodiment, the frequency modulation unit 704 may be further configured to perform signal processing on the downlink transmit signal, and may also be configured to perform signal processing on the uplink receive signal; and a signal processing manner includes, but is not limited to, amplitude modulation, phase modulation, or filtering. For example, the frequency modulation unit 704 may be configured to perform scaleable sample filtering on the downlink transmit signal, so that when a sampling bandwidth, also referred to as an observation bandwidth, is insufficient, upsampling filtering may be added to increase the observation bandwidth to avoid aliasing.

Optionally, a digital filter, such as a filter that simulates IRF processing may be used during the signal processing. IRF intermodulation interference is cancelled by using a digital processing method in a baseband, zero frequency, and a signal passing through an intermediate radio frequency is equivalent to a signal passing through a filter, so that accuracy of cancellation can be improved by performing simulation by using the digital filter in the baseband.

Optionally, in another embodiment, in this embodiment of the present invention, the device 700 for reducing intermodulation interference may obtain through estimation the first intermodulation interference signal in a digital domain manner without a need of designing an analog circuit or adding a digital-to-analog conversion component and PCB space, thereby simplifying a design and reducing costs. The device 700 for reducing intermodulation interference may be a base station. Specifically, the device 700 may be located in an RRU, that is, implemented by the RRU, or may be implemented by a BBU; and the device 700 may also be located between the RRU and the BBU as an independent apparatus. Optionally, apparatuses may be connected by using a CPRI interface, for example, when an execution device of the foregoing method is located in the RRU, the RRU acquires a sampling point or a delay item from the BBU by using the CPRI interface. It should be understood that this embodiment of the present invention is not limited thereto.

Figure 8:
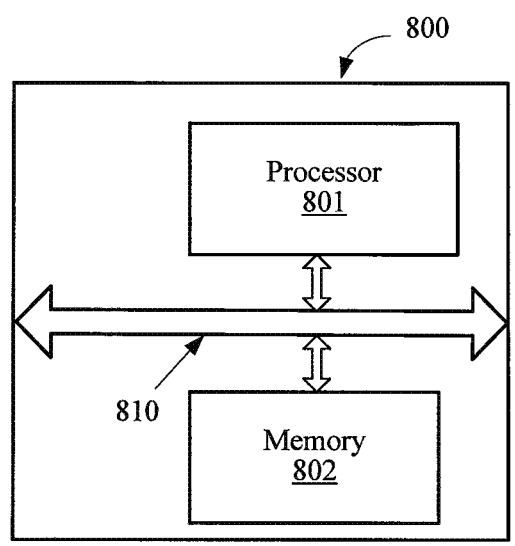
FIG. 8 is a structural block diagram of a device for reducing intermodulation interference according to another embodiment of the present invention.

FIG. 8 is a structural block diagram of a device for reducing intermodulation interference according to another embodiment of the present invention. In this embodiment, the device 800 includes a processor 801 and a memory 802. The processor 801 controls an operation of the device 800, and the processor 801 may also be referred to as a CPU. The memory 802 may include a read-only memory and a random access memory and provide instructions and data to the processor 801. A part of the memory 802 may further include a non-volatile random access memory (NVRAM). The processor 801 and the memory 802 are coupled together by using a bus system 810, where the bus system 810 includes not only a data bus but also a power bus, a control bus, a state signal bus, and the like. However, for clear description, various buses in the figure are denoted as the bus system 810.

The method disclosed in the foregoing embodiment of the present invention may be applied to the foregoing device 800. The processor 801 may be an integrated circuit chip, and has a signal processing capability. In an implementation process, steps of the foregoing method may be implemented by using an integrated logic circuit of hardware or instructions of a software form in the processor 801.

In this embodiment of the present invention, a storage chip performs the following operations according to an operation instruction, the operation instruction may be stored in an operating system stored in the memory 802 and invoked by the processor 801:

performing real-time estimation according to time domain information of M downlink transmit signals, to obtain a first intermodulation interference signal; and cancelling, according to the first intermodulation interference signal obtained through estimation, intermodulation interference generated by the M downlink transmit signals in an uplink receive signal, where M is an integer greater than or equal to 2, and the M downlink transmit signals are baseband signals that are transmitted on M carriers and that are not combined.

In this embodiment of the present invention, intermodulation interference generated by M downlink transmit signals in an uplink receive signal is cancelled by using first intermodulation interference that is obtained by performing real-time estimation according to time domain information of the M downlink transmit signals. Based on the foregoing solution, first intermodulation interference obtained by performing real-time estimation on time domain information of M downlink transmit signals approximates intermodulation interference that is actually generated by the M downlink transmit signals in an uplink receive signal, so that the actually generated intermodulation interference can be effectively cancelled, thereby reducing intermodulation interference and improving system performance.

The device 800 for reducing intermodulation interference can implement the embodiments in FIG. 2 to FIG. 4, so that in order to avoid repetition, details are not described herein again.

Optionally, in an embodiment, in a possible implementation manner, the processor 801 may be specifically configured to: acquire M sampling points that respectively correspond to the M downlink transmit signals at a first moment; determine a component element set according to the acquired M sampling points, where component elements included in the component element set are conjugates of the M sampling points and the M sampling points; determine, according to the component element set, N intermodulation components in a multinomial for estimating the first intermodulation interference signal, where the intermodulation component is a product of at least two component elements and N is a positive integer; determine, according to the N intermodulation components and the uplink receive signal, N coefficients that respectively correspond to the N intermodulation components; and obtain the first intermodulation interference signal according to a multinomial including the determined N intermodulation components and the determined coefficients corresponding to the N intermodulation components.

It should be understood that values of M and N may be the same or different, which is not limited in this embodiment of the present invention. It should be further noted that one component element may be selected from the component element set and is determined as an intermodulation component. Preferably, at least two component elements may be selected from the component element set, and a product of the at least two component elements is determined as an intermodulation component.

In another possible implementation manner, the processor 801 may be specifically configured to: acquire T delay items, where the delay item indicates a sampling value of a downlink transmit signal after a delay at a first moment and T is a positive integer; determine a component element set according to the T delay items, where component elements included in the component element set are conjugates of the T delay items and the T delay items; determine, according to the component element set, N intermodulation components in a multinomial for estimating the first intermodulation interference signal, where the intermodulation component is a product of at least two component elements; determine, according to the N intermodulation components and the uplink receive signal, N coefficients that respectively correspond to the N intermodulation components; and obtain the first intermodulation interference signal according to a multinomial including the determined N intermodulation components and the determined coefficients corresponding to the N intermodulation components.

It should be understood that a manner of acquiring a delay item is not limited in this embodiment of the present invention. It should be further noted that the foregoing examples are merely exemplary, for example, the delay may also be ±2, ±3, . . . ; and a quantity of the downlink transmit signals may be two or more.

By means of the foregoing solution, based on M sampling points that respectively correspond to the M downlink transmit signals at a same moment, in a scenario of a wireless multipath channel, for example, different downlink transmit signals have different physical channels, and may arrive at different time, or transmission speeds of downlink transmit signals of different frequencies in a same channel are different; as a result, signals are scattered within different time. Therefore, an original source signal may be better recovered by weighting signals at different time intervals. Therefore, in consideration to the T delay items, that is, the sampling values of the downlink transmit signals after the delay at the first moment, accuracy of obtaining through estimation the first intermodulation interference signal is further improved, and the first intermodulation interference signal is used to cancel an intermodulation interference signal generated by the M downlink transmit signals in the uplink receive signal, so that the intermodulation interference is further reduced.

It should be further noted that the component element set may also be determined according to the M sampling points and the T delay items. For specific examples, reference may be made to the foregoing descriptions, and details are not described herein again.

Further, the processor 801 may be specifically configured to: perform elimination on a matrix [A Y] of N rows and N+1 columns to obtain a matrix [A' Y'], and determine row components in a matrix Y' of N rows and one column as the N coefficients, where A is a matrix of N rows and N columns, and Y is a matrix of N rows and one column, which is expressed as follows:

$$A = \begin{bmatrix} cor(s_1, s_1) & cor(s_1, s_2) & \ldots & cor(s_1, s_{N-1}) & cor(s_1, s_N) \\ cor(s_2, s_1) & cor(s_2, s_2) & \ldots & \ldots & cor(s_2, s_N) \\ \ldots & \ldots & \ldots & \ldots & \ldots \\ cor(s_{N-1}, s_1) & \ldots & \ldots & \ldots & cor(s_{N-1}, s_N) \\ cor(s_N, s_1) & cor(s_N, s_2) & \ldots & cor(s_N, s_{N-1}) & cor(s_N, s_N) \end{bmatrix},$$

and $$Y = \begin{bmatrix} cor(y, s_1) \\ cor(y, s_2) \\ \ldots \\ cor(y, s_{N-1}) \\ cor(y, s_N) \end{bmatrix},$$

where cor indicates a correlation function, for example, cor(x1, x2) indicates an inner product of vectors x1 and x2 of a same length, cor(x1, x2)=cor(x2, x1), $s_i$ indicates an $i^{th}$ intermodulation component of the N intermodulation components, where i is a positive integer and ranges from 1 to N, that is, the N intermodulation components are $s_1, s_2, \ldots,$ and $s_N$ respectively, and y indicates the foregoing uplink receive signal.

It is assumed that $$Y' = \begin{bmatrix} p_1 \\ p_2 \\ \ldots \\ p_{N-1} \\ p_N \end{bmatrix}$$

in the matrix [A' Y'] is obtained by performing elimination, that is, the N intermodulation coefficients are $p_1, p_2, \ldots,$ and $p_N$ respectively. An elimination method in this embodiment of the present invention may use a Gauss elimination method or another equivalent elimination method, and it should be understood that this embodiment of the present invention is not limited thereto.

Correspondingly, a product of an $i^{th}$ intermodulation component $s_i$ of the N intermodulation components and an $i^{th}$ intermodulation coefficient $p_i$ of the corresponding N intermodulation coefficients is determined as an $i^{th}$ component $s_i^{pim} = p_i \times s_i$ of the first intermodulation interference signal obtained through estimation, and the estimated first intermodulation interference signal is $$S^{pim}[N] = \sum_{i=1}^{N} p_i \times s_i.$$

Optionally, in another embodiment, the processor 801 may be further configured to perform time alignment on the uplink receive signal and the M downlink transmit signals according to the N intermodulation components and the uplink receive signal.

Optionally, in another embodiment, the processor 801 is further configured to perform time alignment, also referred to as timing synchronization, on the uplink receive signal and the downlink transmit signal. Optionally, time alignment is performed on the uplink receive signal and the M downlink transmit signals according to the N intermodulation components and the uplink receive signal.

Further, the processor 801 may be specifically configured to: determine, according to an equation $$cort(s, y, \Delta t) = \sum_{i=1}^{N} s_i \times y^*[i + \Delta t] = \sum_{i=1}^{N} s[i + \Delta t] \times y_i^*,$$

that when a correlated peak cort(s,y,$\Delta$t) is maximum, a value of $\Delta$t is a timing error, where cort(s,y,$\Delta$t) indicates an inner product of a vector s and a vector y that has a time offset of $\Delta$t, which are of a same length, or cort(s,y,$\Delta$t) indicates an inner product of a vector s that has a time offset of $\Delta$t and a vector y, which are of a same length. Optionally, by means of correlated searching, values of $\Delta$t are traversed within a specific range, so that when the correlated peak cort(s,y,$\Delta$t) is maximum, $\Delta$t is determined as the timing error, where $s_i$ is an $i^{th}$ intermodulation component of the N intermodulation components, y*[i+$\Delta$t] indicates a conjugate of an $i^{th}$ component of the uplink receive signal y after a delay of $\Delta$t, where i is a positive integer and ranges from 1 to N. Time alignment is performed on the uplink receive signal and the M downlink transmit signals according to the timing error.

Optionally, in another embodiment, the processor 801 may be specifically configured to: when the first intermodulation interference signal meets a cancellation condition, cancel the intermodulation interference signal in the uplink receive signal by using the first intermodulation interference signal. The cancellation condition may include at least one of the following: an amplitude of the first intermodulation interference signal is greater than a first threshold, a frequency of the first intermodulation interference signal falls within a frequency band range of the uplink receive signal, that is, a frequency spectrum of the first intermodulation interference signal partially or entirely falls within a bandwidth of the uplink receive signal, and a fluctuation range of the first intermodulation interference signal is less than a second threshold, that is, the first intermodulation interference signal is stable. In a case in which the first intermodulation interference signal meets the cancellation condition, that is, in a case in which it is estimated that intermodulation generated between multiple downlink transmit signals causes serious interference to the uplink receive signal, the intermodulation interference signal in the uplink receive signal is cancelled by using the first intermodulation interference signal, to reduce interference. For specific examples, reference may be made to the foregoing descriptions, and details are not described herein again.

Optionally, in another embodiment, multiple downlink transmit signals in this embodiment of the present invention may be from a same transmit channel or different transmit channels. Using two downlink transmit signals as an example, as exemplarily shown in FIG. 5, PIM interference between a downlink transmit signal Tx1 from a channel 1 and a downlink transmit signal Tx2 from a channel 2 is generated in an uplink receive signal Rx2 from the channel 2. By cancelling the PIM interference in the receive signal by using the first intermodulation interference signal obtained through estimation, a signal-to-noise ratio can be improved and sensitivity of a receiver can be improved.

Optionally, in another embodiment,

Optionally, in another embodiment, the processor 801 may be further configured to separately perform frequency modulation on the N intermodulation components, and optionally, the processor 801 may perform frequency modulation on each intermodulation component of the N intermodulation components according to a frequency difference between each intermodulation component of the N intermodulation components and the uplink receive signal.

Optionally, in another embodiment, the processor 801 may be further configured to perform signal processing on the downlink transmit signal, and may also be configured to perform signal processing on the uplink receive signal; and a signal processing manner includes, but is not limited to, amplitude modulation, phase modulation, or filtering. For example, the processor 801 may be configured to perform scaleable sample filtering on the downlink transmit signal, so that when a sampling bandwidth, also referred to as an observation bandwidth, is insufficient, upsampling filtering may be added to increase the observation bandwidth to avoid aliasing.

Optionally, a digital filter, such as a filter that simulates IRF processing may be used during the signal processing. IRF intermodulation interference is cancelled by using a digital processing method in a baseband, zero frequency, and a signal passing through an intermediate radio frequency is equivalent to a signal passing through a filter, so that accuracy of cancellation can be improved by performing simulation by using the digital filter in the baseband.

Optionally, in another embodiment, in this embodiment of the present invention, the device 800 for reducing intermodulation interference may obtain through estimation the first intermodulation interference signal in a digital domain manner without a need of designing an analog circuit or adding a digital-to-analog conversion component and PCB space, thereby simplifying a design and reducing costs. The device 800 for reducing intermodulation interference may be a base station. Specifically, the device 800 may be located in an RRU, that is, implemented by the RRU, or may also be implemented by a BBU; and the device 800 may be located between the RRU and the BBU as an independent apparatus, for example, when an execution device of the foregoing method is located at the RRU, the RRU acquires a sampling point or a delay item from the BBU by using a CPRI interface. Optionally, apparatuses may be connected by using the CPRI interface. It should be understood that this embodiment of the present invention is not limited thereto.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device, which may be a personal computer, a server, or a network device, to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for reducing intermodulation interference, the method comprising:

performing, by a base station, real-time estimation according to time domain information of M downlink transmit signals, to obtain a first intermodulation interference signal;

cancelling, by the base station, according to the first intermodulation interference signal, intermodulation interference generated by the M downlink transmit signals in an uplink receive signal, wherein M is an integer greater than or equal to 2, and the M downlink transmit signals are M baseband signals that are transmitted on M carriers and that are not combined;

wherein performing, by the base station, the real-time estimation according to time domain information of M downlink transmit signals, to obtain the first intermodulation interference signal comprises:

determining, by the base station, according to a component element set, N intermodulation components in a multinomial for estimating the first intermodulation interference signal, wherein each intermodulation component is a product of at least two component elements and N is a positive integer, determining, by the base station, according to the N intermodulation components and the uplink receive signal, N coefficients that respectively correspond to the N intermodulation components, and obtaining, by the base station, the first intermodulation interference signal according to a multinomial comprising the N intermodulation components and the coefficients corresponding to the N intermodulation components;

wherein determining, by the base station, according to the N intermodulation components and the uplink receive signal, N coefficients that respectively correspond to the N intermodulation components comprises:

performing, by the base station, elimination on a matrix [A Y] to obtain a matrix [A' Y'], wherein components in the matrix Y' are the N coefficients, wherein $$A = \begin{bmatrix} cor(s_1, s_1) & cor(s_1, s_2) & \ldots & cor(s_1, s_{N-1}) & cor(s_1, s_N) \\ cor(s_2, s_1) & cor(s_2, s_2) & \ldots & \ldots & cor(s_2, s_N) \\ \ldots & \ldots & \ldots & & \ldots \\ cor(s_{N-1}, s_1) & \ldots & & \ldots & cor(s_{N-1}, s_N) \\ cor(s_N, s_1) & cor(s_N, s_2) & \ldots & cor(s_N, s_{N-1}) & cor(s_N, s_N) \end{bmatrix},$$

and $$Y = \begin{bmatrix} cor(y, s_1) \\ cor(y, s_2) \\ \ldots \\ cor(y, s_{N-1}) \\ cor(y, s_N) \end{bmatrix},$$

wherein cor indicates a correlation function, y indicates the uplink receive signal, and $s_i$ indicates an $i^{th}$ intermodulation component of the N intermodulation components, wherein i is a positive integer and ranges from 1 to N; and obtaining, by the base station, the first intermodulation interference signal according to the multinomial comprising the N intermodulation components and the coefficients corresponding to the N intermodulation components comprises:

obtaining, by the base station, the first intermodulation interference signal according to:

$$S^{pim}[N] = \sum_{i=1}^{N} p_i \times s_i,$$

wherein $p_i$ is an $i^{th}$ intermodulation coefficient of the N coefficients, and $s_i$ is an $i^{th}$ intermodulation component of the N intermodulation components, wherein i is a positive integer and ranges from 1 to N.

2. The method according to claim 1, wherein
the component element set comprises: M sampling points corresponding to the M downlink transmit signals at a first moment and conjugates of the M sampling points.

3. The method according to claim 1, wherein
the component element set comprises: T delay items and conjugates of the T delay items, where each delay item indicates a sampling value of a downlink transmit signal after a delay at a first moment.

4. The method according to claim 1, wherein before obtaining, by the base station, the first intermodulation interference signal according to a multinomial comprising the N intermodulation components and the coefficients corresponding to the N intermodulation components, the method further comprises:

performing, by the base station, time alignment on the uplink receive signal and the M downlink transmit signals according to the N intermodulation components and the uplink receive signal.

5. The method according to claim 4, wherein performing, by the base station, time alignment on the uplink receive signal and the M downlink transmit signals according to the N intermodulation components and the uplink receive signal comprises:

determining, by the base station, according to $$cort(s, y, \Delta t) = \sum_{i=1}^{N} s_i \times y^*[i + \Delta t],$$

that when cort(s,y,Δt) is maximum, a value of Δt is a timing error, wherein $s_i$ is the $i^{th}$ intermodulation component of the N intermodulation components, y*[i+Δt] indicates a conjugate of an $i^{th}$ component of the uplink receive signal y after a delay of Δt, wherein i is a positive integer and ranges from 1 to N; and performing, by the base station, time alignment on the uplink receive signal and the M downlink transmit signals according to the timing error.

6. The method according to claim 1, wherein cancelling, by the base station according to the first intermodulation interference signal, intermodulation interference generated by the M downlink transmit signals in an uplink receive signal comprises:

when the first intermodulation interference signal meets a cancellation condition, cancelling, by the base station, the intermodulation interference in the uplink receive signal by using the first intermodulation interference signal, wherein the cancellation condition comprises at least one of the following:

an amplitude of the first intermodulation interference signal is greater than a first threshold, a frequency of the first intermodulation interference signal falls within a frequency band range of the uplink receive signal, and a fluctuation range of the first intermodulation interference signal is less than a second threshold.

7. A device, comprising:
a processor;
a memory coupled to the processor by using a bus system, wherein the memory comprises computer-executable instructions which, when executed by the processor, cause the device to:

perform real-time estimation according to time domain information of M downlink transmit signals, to obtain a first intermodulation interference signal, cancel, according to the first intermodulation interference signal, intermodulation interference generated by the M downlink transmit signals in an uplink receive signal, wherein M is an integer greater than or equal to 2, and the M downlink transmit signals are M baseband signals that are transmitted on M carriers and that are not combined, determine according to a component element set, N intermodulation components in a multinomial for estimating the first intermodulation interference signal, wherein each intermodulation component is a product of at least two component elements and N is a positive integer, determine according to the N intermodulation components and the uplink receive signal, N coefficients that respectively correspond to the N intermodulation components, obtain the first intermodulation interference signal according to a multinomial comprising the N intermodulation components and the coefficients corresponding to the N intermodulation components, perform elimination on a matrix [A Y] to obtain a matrix [A' Y'], wherein components in the matrix Y' are the N coefficients, wherein $$A = \begin{bmatrix} cor(s_1, s_1) & cor(s_1, s_2) & \ldots & cor(s_1, s_{N-1}) & cor(s_1, s_N) \\ cor(s_2, s_1) & cor(s_2, s_2) & \ldots & & cor(s_2, s_N) \\ \ldots & \ldots & \ldots & & \ldots \\ cor(s_{N-1}, s_1) & & & \ldots & cor(s_{N-1}, s_N) \\ cor(s_N, s_1) & cor(s_N, s_2) & \ldots & cor(s_N, s_{N-1}) & cor(s_N, s_N) \end{bmatrix},$$

and $$Y = \begin{bmatrix} cor(y, s_1) \\ cor(y, s_2) \\ \ldots \\ cor(y, s_{N-1}) \\ cor(y, s_N) \end{bmatrix},$$

wherein cor indicates a correlation function, y indicates the uplink receive signal, and $s_i$ indicates an $i^{th}$ intermodulation component of the N intermodulation components, wherein i is a positive integer and ranges from 1 to N; and obtain the first intermodulation interference signal according to:

$$S^{pim}[N] = \sum_{i=1}^{N} p_i \times s_i,$$

wherein $p_i$ is an $i^{th}$ intermodulation coefficient of the N coefficients, and $s_i$ is an $i^{th}$ intermodulation component of the N intermodulation components, wherein i is a positive integer and ranges from 1 to N.

8. The device according to claim 7, wherein the component element set comprises: M sampling points corresponding to the M downlink transmit signals at a first moment and conjugates of the M sampling points.

9. The device according to claim 7, wherein the component element set comprises: T delay items and conjugates of the T delay items, wherein each delay item indicates a sampling value of a downlink transmit signal after a delay at a first moment.

10. The device according to claim 7, wherein the computer-executable instructions, when executed by the processor, further cause the device to:
before obtaining the first intermodulation interference signal according to a multinomial comprising the N intermodulation components and the coefficients corresponding to the N intermodulation components, perform time alignment on the uplink receive signal and the M downlink transmit signals according to the N intermodulation components and the uplink receive signal.

11. The device according to claim 10, wherein the computer-executable instructions, when executed by the processor, further cause the device to:
determine according to $$cort(s, y, \Delta t) = \sum_{i=1}^{N} s_i \times y^*[i + \Delta t],$$

that when cort(s,y,Δt) is maximum, a value of Δt is a timing error, wherein $s_i$ is the $i^{th}$ intermodulation component of the N intermodulation components, y*[i+Δt] indicates a conjugate of an $i^{th}$ component of the uplink receive signal y after a delay of Δt, wherein i is a positive integer and ranges from 1 to N; and perform time alignment on the uplink receive signal and the M downlink transmit signals according to the timing error.

12. The device according to claim 7, wherein the computer-executable instructions, when executed by the processor, further cause the device to:
when the first intermodulation interference signal meets a cancellation condition, cancel the intermodulation interference in the uplink receive signal by using the first intermodulation interference signal, wherein the cancellation condition comprises at least one of the following:
an amplitude of the first intermodulation interference signal is greater than a first threshold, a frequency of the first intermodulation interference signal falls within a frequency band range of the uplink receive signal, and a fluctuation range of the first intermodulation interference signal is less than a second threshold.

* * * * *